United States Patent
Van Der Kamp et al.

(10) Patent No.: US 9,460,341 B2
(45) Date of Patent: Oct. 4, 2016

(54) METHOD OF AND ANIMAL TREATMENT SYSTEM FOR PERFORMING AN ANIMAL RELATED ACTION ON AN ANIMAL PART IN AN ANIMAL SPACE

(71) Applicant: Lely Patent N.V., Maassluis (NL)

(72) Inventors: Adolf Jan Van Der Kamp, Maassluis (NL); Xiangyu Song, Rotterdam (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 14/654,589

(22) PCT Filed: Nov. 20, 2013

(86) PCT No.: PCT/NL2013/050836
§ 371 (c)(1),
(2) Date: Jun. 22, 2015

(87) PCT Pub. No.: WO2014/116101
PCT Pub. Date: Jul. 31, 2014

(65) Prior Publication Data
US 2015/0339522 A1    Nov. 26, 2015

(30) Foreign Application Priority Data
Jan. 22, 2013   (NL) ..................................... 2010157

(51) Int. Cl.
G06K 9/00      (2006.01)
H04N 13/00    (2006.01)
(Continued)

(52) U.S. Cl.
CPC ............ *G06K 9/00362* (2013.01); *A01J 5/017* (2013.01); *A01J 5/0175* (2013.01); *G06K 9/46* (2013.01);
(Continued)

(58) Field of Classification Search
None
See application file for complete search history.

(56) References Cited

U.S. PATENT DOCUMENTS

| | | | | |
|---|---|---|---|---|
| 6,037,986 A | * | 3/2000 | Zhang | H04N 5/144 348/699 |
| 2007/0274402 A1 | * | 11/2007 | Ibrahim | G06T 7/2053 375/240.29 |
| 2008/0314324 A1 | * | 12/2008 | Pettersson | A01J 5/0175 119/14.08 |

(Continued)

FOREIGN PATENT DOCUMENTS

| | | | |
|---|---|---|---|
| GB | WO 2010046669 A1 * | 4/2010 | ............ A01J 5/0175 |
| SE | WO 2005094565 A1 * | 10/2005 | ............ A01J 5/0175 |

(Continued)

OTHER PUBLICATIONS

International Search Report issued Feb. 17, 2014, in PCT/NL2013/050836, filed Nov. 20, 2013.

*Primary Examiner* — Avinash Yentrapati
(74) *Attorney, Agent, or Firm* — Oblon, McClelland, Maier & Neustadt, L.L.P

(57) ABSTRACT

A method determining a position of an animal part in an animal space in at least one direction, including: obtaining a two-dimensional image containing depth information; preprocessing the image according to first and second preprocessing modes, to provide respective first and second preprocessed images; comparing the first preprocessed image and the second preprocessed image to obtain at least one image difference; if the at least one image difference is below or equal to a respective predetermined threshold, processing the first preprocessed image according to a first position determining mode, and if the at least one image difference is above the predetermined threshold, processing the second preprocessed image according to a second position determining mode, to provide the position of the animal part. If a fast but not very accurate processing mode, and a slower but more accurate mode, are available, the method can suitably select one of these modes.

9 Claims, 1 Drawing Sheet

(51) Int. Cl.
*G06K 9/62* (2006.01)
*G06K 9/46* (2006.01)
*G06K 9/52* (2006.01)
*A01J 5/017* (2006.01)
*G06T 7/00* (2006.01)

(52) U.S. Cl.
CPC ............... *G06K 9/52* (2013.01); *G06K 9/6202* (2013.01); *G06T 7/0042* (2013.01); *H04N 13/00* (2013.01); *G06K 2009/4666* (2013.01); *G06T 2207/10028* (2013.01); *H04N 2013/0081* (2013.01)

(56) References Cited

U.S. PATENT DOCUMENTS

2010/0199915 A1* 8/2010 Pettersson ............. A01J 5/0175 119/14.08
2011/0245975 A1* 10/2011 Daubner ............... A01J 5/0175 700/259

FOREIGN PATENT DOCUMENTS

| WO | WO 2005/094565 A1 | 10/2005 |
| WO | WO 2010/046669 A1 | 4/2010 |

* cited by examiner

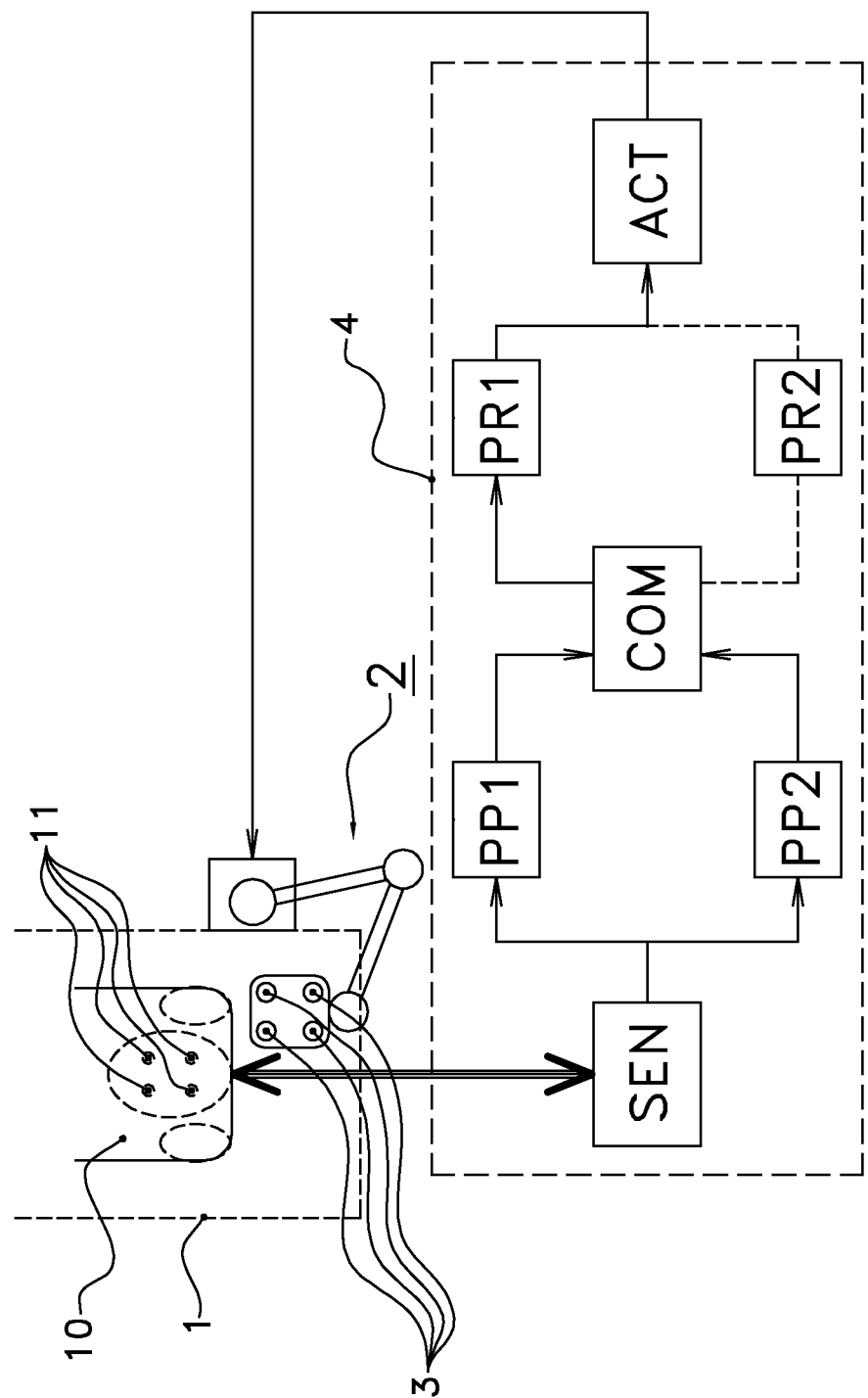

METHOD OF AND ANIMAL TREATMENT SYSTEM FOR PERFORMING AN ANIMAL RELATED ACTION ON AN ANIMAL PART IN AN ANIMAL SPACE

The present invention relates to a method of performing an animal related action on an animal part in an animal space.

Different methods and techniques are known to determine a position of an animal part in an animal space.

Generally, techniques which provide higher quality results require more processing time and/or more processing power, while relatively fast techniques or techniques that require a relatively low amount of processing power have relatively low quality results.

Thus, the selection of a certain technique to process 3D images requires selecting a balance between processing speed or power at the one hand and image quality at the other. Furthermore, the quality of the image processing techniques may depend on the actual circumstances at the moment of obtaining images, such as temperature and humidity, which makes selection of the most suitable image processing technique more difficult.

It is an object of the invention to provide a relatively fast and efficient method of determining a position of an animal part in at least one direction, which method at the same time ensures images of sufficiently high quality.

The present invention provides a method of performing an animal related action on an animal part in an animal space provided with an animal related device, the method comprising a step of determining a position in at least one direction of the animal part of the animal, and controlling the animal related device to perform an animal related action on the basis of the provided position of the animal part, the step of determining the position:

obtaining a two-dimensional image of a part of the animal space intended to contain the animal part, and containing depth information by means of a 3D sensor device, preprocessing the image according to a first preprocessing mode, including noise-reducing the image according to a first noise reduction mode and assigning a group of pixels to the animal part according to a first set of rules, to thereby provide a first preprocessed image with a first image of the animal part, preprocessing the image according to a second preprocessing mode, including noise-reducing the image according to a second noise reduction mode and assigning a group of pixels to the animal part according to a second set of rules, to thereby provide a second preprocessed image with a second image of the animal part, comparing the first preprocessed image and the second preprocessed image to obtain at least one image difference, if the at least one image difference is below or equal to a respective predetermined threshold, processing the first preprocessed image according to a first position determining mode, to thereby provide the position of the animal part, and if the at least one image difference is above the predetermined threshold, processing the second preprocessed image according to a second position determining mode, to thereby provide the position of the animal part.

In the present invention, a 2D image containing depth information means that there is a detector device arranged to obtain a 2D image, each part of the image containing depth information, which mostly means that each part of the image contains a separate value indicating a distance to the detector device. In practice, the image will most often comprise a number of pixels in a 2D array, wherein, for each pixel, there is provided a distance, or depth, information. One could also say that such a 2D image with depth information is a 3D image, and the terms are used herein interchangeably.

Furthermore, the preprocessing modes may differ in e.g. the way noise is reduced. There are many ways of noise reduction (NR), each with their pros and cons. Some are very strict, in that they discard all pixels in the image that do not fulfil the strictest requirements, thereby reducing virtually all noise, inevitably together with some "good" parts of the image. Lateron, this requires some "repair" algorithms to be able to determine correct position. Other NR ways are less strict, but result in less clean images, which may result in a quick determination of position but may suffer from more uncertainty therein. Numerous examples of NR techniques may be found in the prior art, and for details about those techniques, reference is made to that prior art.

In the present invention, the substep of "assigning a group of pixels to the animal part according to a first set of rules" relates to image recognition. If an image is to contain a certain animal part, such as the backend or an udder with teats, then said rules contain rules, algorithms, that enable to detect said animal part in the image. For example, an udder is, in a first approximation, a semi-globe with four protrusions that are more or less cylindrical with a rounded top. Techniques to discern such structures in a 3D-image are well-known in the field, comprising e.g. segmentation and so on. Since details about recognising animal parts in a 3D image are not part of the true invention here, only reference is made to existing image recognition techniques in the field.

The present method uses two different position determining techniques, each comprising a preprocessing step according to a preprocessing mode and a processing step according to a position determining mode. Advantageously, the first technique is a relatively fast method and/or a method which requires low processing power, while the second technique is a high quality technique requiring relatively more processing time and/or processing power. However, it may also be possible that the first technique is a fast technique which provides accurate results in certain circumstances and a second technique that performs well in all circumstances, but requires more processing time and/or processing power.

The method of the invention proposes to perform preprocessing of the information obtained by the sensor device with at least two different preprocessing modes. By comparison of the results of preprocessing according to the first preprocessing mode and the second preprocessing mode, the accuracy of the results of the first preprocessing mode can be assessed, and a suitable one selected.

If the difference between the results of the first preprocessing mode and the second preprocessing mode is relatively small, in particular below or equal to a predetermined threshold value, it can be concluded that the first preprocessing mode provides relatively or at least sufficiently accurate results. This provides a promising starting point to perform processing of the first preprocessed image according to a first position determining mode, to thereby provide the position of the animal part in a relatively short time and with sufficient accuracy.

In such embodiment, the processing of the second preprocessed image according to the second position determining mode may not be necessary and the processing of the second preprocessed image may be omitted. However, it may also be possible to process the second preprocessed image according to the second position determining mode and compare the final results with the final results of processing of the first preprocessed image according to a first position determining mode to determine final quality of the image processing according to the first technique. The latter may for instance be performed at regular intervals, i.e. after a plurality of images, for example every tenth image.

If the difference is above the predetermined threshold, it can be expected that image processing according to the first technique will provide relatively low quality results. In such case, processing of the second preprocessed image according to a second position determining mode can be used to provide the position of the animal part, more accurately but, on average, also more slowly. In this case, the processing of the first preprocessed image according to a first position determining mode does no longer have to take place, as it may provide unreliable positions of the animal.

The method according to the invention is advantageously performed repeatedly, such as with a predetermined repetition frequency, such as between 2 and 24 times per second, in order to be able to monitor and respond to movement of the animal part. In particular for such cases, the present method provides the advantage that an optimum balance between accuracy and speed of processing (or computing/processing power) is offered. This enables a quick and efficient animal related action through a short response time and high accuracy.

The use of a first and second (pre)processing mode does not preclude the use of further (pre)processing modes. The above method makes it possible to use a quick image processing method when possible, while at the same time guaranteeing that all processing results have sufficient quality. In this way, the most suitable image processing technique is automatically selected.

In further embodiments, also three or more different image processing techniques may be available, wherein for each of these techniques preprocessing of the image according to a respective preprocessing mode is performed, including noise-reducing the image according to a respective noise reduction mode and assigning a group of pixels to the animal part according to a respective set of rules, to thereby provide a preprocessed image with an image of the animal part. By comparing the preprocessed images resulting from the preprocessing step of the three or more image processing techniques, at least one of the techniques may be selected as most suitable to perform processing of the respective preprocessed image according to a position determining mode, to thereby provide the position of the animal part. The most suitable technique will usually be the technique that provides the fastest sufficiently accurate results.

In an embodiment, each preprocessed image has a total number of pixels, and the first and second image of the animal part each have a length, width and area, as measured in pixels, and wherein at least one image difference comprises one of the difference in length, the difference in width and the difference in area of the first and second image of the animal part.

On the basis of the total number of pixels of the first preprocessed image and the second preprocessed image, which are preferably equal, a image difference between the first and second preprocessed image may be determined. This image difference may for example be based on difference in length, width or area, as measured in pixels between an animal part in the first preprocessed image and the same animal part in the second preprocessed image. In particular, the difference between the pixel areas of an animal part on the first and second preprocessed image may provide a good basis of determination of a image difference between the first and second preprocessed image. Such a difference may be a consequence of the difference in the way the image is preprocessed, for example there being a stricter noise-removal algorithm, thus cutting off more of the original image. Lateron, in the processing of the image, care will be taken to provide still the correct position etc. However, if the difference is larger than is to be expected on the basis of differences in the preprocessing modes, it is to be concluded that there are other causes, and a selection between preprocessing modes is to be made, in particular of the most robust and reliable preprocessing mode.

In an embodiment, the predetermined threshold is an absolute number of pixels or a percentage of the total number of pixels. It has been found that an absolute number of pixels or a percentage of the total number of pixels is a good measure to determine a image difference between the first preprocessed image and the second preprocessed image, and can therefore appropriately used as a threshold value to determine whether the first technique provides sufficient quality. For example, the image could have 50×60 pixels. Then, the animal part, such as the hind part of the animal body, may be positioned such that it is imaged in about half of the image, i.e. about 25×30 pixels. Depending on the precise type of preprocessing, a useful threshold for a difference in area could be e.g. 200 pixels. that is, if the difference in pixel area is 200 pixels or more, the better, more reliable preprocessing mode is selected. Alternatively, in this case, the threshold could be 20%, that is, if the pixel areas of the animal part in the two preprocessed images differs more than 20%, the better preprocessing mode is selected. Of course, the precise selection of the threshold depends on what preprocessing algorithms are used, on the required precision and so on. For example, in case just the rough position of the backend of a cow needs to be determined, this need not be more precise than say 10 cm, although in practice a narrower value, such as 2 cm, is preferred. Furthermore, if a teat cup is to be connected to a teat, it is useful to have an accuracy of about 1 cm or better, such as preferably 0.5 cm. In any case, a user of the method may have made one or more criteria that enable to choose a threshold before the decision is to be taken.

As mentioned above, the step of processing the second preprocessed image according to the second position determining mode may take longer and/or more processing power, on average, than the step of processing the first preprocessed image according to a first position determining mode. in such cases, selecting the second mode only if the image difference is found to exceed a threshold leads to an increase in processing speed.

The method of the invention may for example be used in methods, wherein the position of one or more animal parts should be determined with sufficient accuracy, for instance during a part of a milking operation. Advantageously, the animal related device is one of a milking device, a premilking device, a teat cleaning device, and an udder care device. The method may in particular be used to determine the position of an udder, an udder part such as a teat, a rear of the animal and/or a body position of the milking animal. The knowledge about the position of an udder, an udder part such as a teat, a rear of the animal and/or a body position of the animal can be used to automatically connect teat cups to the teats of the milking animal. E.g. if the position of the rear (end) is known, then from knowledge of the type of cow, or from historical data, the approximate position of the udder is also known, so that the robot arm's initial position before the attachment procedure can be set. Herein, the milking operation is to include all steps leading to, and after milking, such as teat cleaning, stimulating and/or premilking, with a brush, a separate teat cup and so on, and spraying the teats with an udder care agent after milking. For such methods, the animal related device is advantageously one of a milking device, a premilking device, a teat cleaning device, and an udder care device, and wherein the method is performed during a part of a milking operation. Alternative relevant methods include all automated procedures on animals comprising a step of moving an animal related device towards the animal part for treatment thereof, such as feeding a calf with an autonomous feeding vehicle, such as with a movable spout.

The invention further relates to an animal treatment system for performing an animal treatment on a milking animal, comprising an animal related device and a controller for controlling the animal related device, wherein the controller comprises a 3D sensor device arranged to obtain a 2D image containing depth information of an animal part of the animal, wherein the controller is arranged to perform the method according to the invention, and wherein the controller is arranged to control the animal related device for performing the animal related treatment on the animal on the basis of the position of the animal part as determined in said method.

As mentioned already above for the method, the animal related device is preferably one of a milking device, a premilking device, a teat cleaning device, and an udder care device. Herein, the animal related treatment may comprise all automated procedures on animals comprising a step of moving an animal related device towards the animal part for treatment thereof. One of the most important of such animal related treatments is milking. Therefore, in most of the following, the system is taken to be a milking system, although in each such case the more general expression "animal treatment system" is explicitly to be included. Advantageously, the animal treatment system is or comprises a milking system, and in particular the animal related device is a milking means comprising a robot arm and a plurality of teat cups, wherein the controller is arranged to position at least one of said robot arm and/or one or more of said teat cups on the basis of the position of the animal part. Quick teat cup connection is important to cause as little discomfort to the animal as possible, and to increase the production capacity of the milking system.

In e.g. a milking system different circumstances may apply, for example with respect to the temperature and/or humidity. These circumstances may have influence on the quality of the image obtained by the 3D sensor device. In particular when it is cold inside a barn, milking animals may produce breathing clouds. These breathing clouds may be visible in the images produced by the 3D sensor device, thereby disturbing the image of the actual position of the milking animal. Other disturbing factors, such as smoke from worker's cigarettes, may also have a negative influence, which may be counteracted by the present method and system.

With the method of the invention, the comparison of the first and second preprocessed image may give an indication of the reliability of the relatively fast technique, and a selection can be made whether the first or second technique should be used to get as soon as possible sufficiently accurate results. This information can also be used for further control of the milking system.

For instance, when the milking system comprises a rotatable platform with multiple milking boxes, wherein a milking animal should be milked within one revolution of the platform, the rotational speed of the platform may be adjusted to the time required for connecting the teat cups to the teats of the milking animal. With the present invention this rotational speed may be adapted in dependence of the selection of the first or second technique to determine a position of an animal part, in particular the position of the teats of the milking animal. For, if the second, generally more time-consuming technique is used for one or more animals, a lower rotational speed may be necessary. And if circumstances, such as a low temperature and thus frequent "breath clouds" prevail, such slower technique may be required quite often, thus considerably slowing down the teat cup connection process.

In an embodiment, the milking means comprise a robot arm and a plurality of teat cups, wherein the controller is arranged to position at least one of said robot arm or one or more of said teat cups on the basis of the position of the animal part.

In an embodiment of both the method and the system, the sensor comprises an ultrasound sensor or an optical sensor. These are sensors often used for obtaining a 3D image. In the case of an ultrasound sensor, the detected signals often being converted to a 2D optical image with depth information. In particular, the optical sensor could be a time-of-flight sensor, or a structured light 3D scanner, for example a camera system that assesses distortion of a reflected speckle pattern imposed on objects. For details, reference is made to the Wikipedia entry http://en.wikipedia.org/wiki/Structured-light_3D_scanner.

Examples are sensor systems from ifm electronic GmbH, Mesa Imaging and PrimeSense, Ltd.

An embodiment of a system, in particular a milking system, according to the invention will now be described in further detail, by way of example only, with reference to the accompanying drawings, in which:

FIG. 1 shows schematically a milking system including a controller to perform the method of the invention.

FIG. 1 shows schematically a milking system comprising a milking box 1 and milking means comprising a robot arm 2 to connect teat cups 3 to the teats 11 of a milking animal 10.

The milking system further comprises a controller 4 to control the milking means, in particular the movements of the milking robot arm 2 to control the positioning of the teat cups 3 on the teats 11 of the milking animal 10.

The controller 4 comprises a 3D sensor device SEN to obtain images of the rear end of the milking animal 10, for example a cow. The images are two-dimensional images containing depth information. The images may for example be images made from above to determine a body position of the rear end of the milking animal 10. Knowledge on the body position of the rear end of the milking animal 10 may be used for positioning the robot arm 2 for placement of teat cups 3. The sensor SEN is for example an ultrasound sensor or an optical sensor, such as a time-of-flight sensor.

The images are processed to obtain a position of the rear end of the milking animal 10. To process the images two processing techniques are available in the controller 4. The first technique comprises a first preprocessing mode in a first pre-processor PP1 and a first position determining mode in a first position processor PR1. The second technique comprises a second preprocessing mode in a second pre-processor PP2 and a second position determining mode in a second position processor PR2.

A relatively simple example of a first preprocessing mode is erosion of the image with a 3×3 matrix, followed by dilation with a 3×3 matrix, while an example of the second preprocessing mode could be erosion with a 7×7 matrix, followed by dilation with a 7×7 matrix. The first position processor PR1 could then be based on e.g. edge detection, while the second position processor PR2 could be based on a moving average of every square of 5*5 pixels for the whole image and following the edge detection of the cow end, the latter operation taking a lot more time. Details about erosion, dilation and edge detection may be found on the respective Wikipedia articles http://en.wikipedia.org/wiki/Erosion_(morphology), http://en.wikipedia.org/wiki/Dilation_(morphology) and http://en.wikipedia.org/wiki/Edge_detection). Many other techniques, including segmentation et cetera, may of course be used, many being based on mathematical morphology.

On the basis of the position determined by the first position processor PR1 and/or the second position processor PR2, an actuator ACT can provide actuation signals to the milking system to move the milking robot arm 2 and/or to place teat cups 3 on the teats 11 of the milking animal 10.

In the first pre-processor PP1 the images are preprocessed according to a first preprocessing mode including noise-reducing the image according to a first noise reduction mode and assigning a group of pixels to the animal part according to a first set of rules. This first preprocessing mode in the first pre-processor PP1 results in a first preprocessed image with a first image of the rear end of the milking animal 10.

In the second pre-processor PP2 the images are preprocessed according to a second preprocessing mode. This second preprocessing mode of the images includes noise-reducing the image according to a second noise reduction mode and assigning a group of pixels to the animal part according to a second set of rules. This second preprocessing in the second pre-processor PP2 results in a second preprocessed image with a second image of the rear end of the milking animal 10.

The first and second pre-processed image of the rear end each have a length, width and area, as measured in pixels. Preferably, the first and second total images have the same or substantially the same number of pixels.

The step of processing the second preprocessed image in the second position processor PR2 according to the second position determining mode takes longer and/or more processing power, on average, than the step of processing in the first position processor PR1 the first preprocessed image according to a first position determining mode.

Therefore, it is generally advantageous to use the step of processing the first preprocessed image according to a first position determining mode to obtain the position of the rear end of the milking animal, when this mode provides sufficient quality to determine this position sufficiently accurate for placement of teat cups 3 on the teats 11.

To determine whether the image quality of the first preprocessed image is of sufficient quality to obtain reliable results in the step of processing the first preprocessed image, a comparator COM is provided to compare the first preprocessed image and the second preprocessed image to obtain at least one image difference. On the basis of this image difference, it can be predicted whether the first technique will provide sufficiently accurate results. The image difference between the first preprocessed image and the second preprocessed image can for instance comprise a difference in length, a difference in width and/or a difference in area of the first and second image of the animal part.

If the at least one image difference is below or equal to the respective predetermined threshold, the first preprocessed image can be processed according to a first position determining mode, and the position of the animal part can be obtained quickly and with sufficient quality. Since the first processing technique will provide a position with sufficient quality, the second processing step according to the second position determining mode does not have to be performed and may be omitted, as shown by a dashed line in FIG. 1.

The second processing step may however also be used to check the quality of the first processing steps according to the first position determining mode. This may for example not be performed for each image, but once for a predetermined plurality of images, for instance every tenth image. In such case the second processing step may also be performed at a lower speed as the information does not have to be available as soon as possible, as it is not directly used to control the milking system.

The threshold used in the comparator COM to determine whether the first preprocessed image sufficiently corresponds to the second preprocessed image, can be any suitable threshold. The predetermined threshold can for example be an absolute number of pixels or a percentage of the total number of pixels of the first preprocessed image and the second preprocessed image. As an example, for an image of, say, 5000 pixels, the predetermined threshold could be 300 pixels. Thus, if 300 or more pixels show a different value (intensity or other parameter), then the two preprocessed images are considered too different, thus causing the use of the second preprocessing image and subsequently the second position determination. Of course, any other predetermined threshold may also be used. Furthermore, the predetermined threshold may also be a percentage of the number of pixels in the image. If the number of pixels used remains the same, then this comes down to a fixed number of pixels. Another criterion may e.g. go one step further, and use a percentage of the number of pixels that is actually identified as representing an animal part. Hereto, at least the first preprocessing may comprise recognising animal parts in the image, by applying one or more criteria known per se. This results in one or more animal parts identified in the image, with a total number of pixels involved. If the second preprocessed image, or the part related to the animal part(s), differs from the first preprocessed image, or the part relating to the corresponding part(s), by more than a predetermined percentage of the number of pixels of the animals part(s), then the images are considered too different. It will be clear that many more such criteria are possible and within scope.

If the at least one image difference is above the predetermined threshold, the first technique based on the first preprocessed image will probably not result in a position determination with sufficient accuracy and, as a result, first processing step according to the first position determining mode may be omitted.

However, to control movement of the robot arm 2 and/or teat cups 3 with respect to the rear end of the milking animal 10, in particular its teats 11, the results of the processing of the second preprocessed image according to the second position determining mode have to be awaited, which will slow down the teat cup connection process as the second position determining mode requires more processing time.

This may also result in that connecting the teat cups 3 to the teats 11 of the milking animal 10 may take more time. This information can also be used for further control of the milking system, or any other animal related system, such as a pre- or aftertreatment system.

For instance, the milking system may comprise a rotatable platform with multiple milking boxes. In such milking system it is usually desirable that a milking animal is milked within one revolution of the platform. When for a number of subsequent milking animals 10, the relatively slow second image processing technique should be used, the rotation speed of the platform may be adjusted to the time required for connecting the teat cups to the teats of the milking animal to avoid that a number of milking animals cannot be milked within a single revolution of the platform.

The information may for example also be used to control the feeding rate at which feed is provided to the milking animals during the milking process. In particular the feeding rate may be slowed down when the second image processing technique is used to make sure that the milking animal will be provided with feed during substantially the complete milking process.

It is remarked that in FIG. 1, the first preprocessor PR1, the second preprocessor PR2, the comparator COM, the first position processor PR1, the second position processor PR2 and the actuator ACT of the controller 4 are indicated as separate parts. In practice, all these functions may be realized, in particular as software steps, in a single processor system, for example a computer. Such computer may for example be part of a general control system of the milking system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method of performing an animal related action on an animal part of an animal in an animal space including an animal related device, the method comprising:
   determining a position in at least one direction of the animal part of the animal, and controlling the animal related device to perform an animal related action on the basis of the determined position of the animal part, the determining the position comprising:
      obtaining a two-dimensional image of a part of the animal space that can contain the animal part, and containing depth information, by a 3D sensor device;
      preprocessing the image according to a first preprocessing mode, including noise-reducing the image according to a first noise reduction mode and assigning a group of pixels to the animal part according to a first set of rules, to thereby provide a first preprocessed image with a first image of the animal part;
      preprocessing the image according to a second preprocessing mode, including noise-reducing the image according to a second noise reduction mode, and assigning a group of pixels to the animal part according to a second set of rules, to thereby provide a second preprocessed image with a second image of the animal part;
      comparing the first preprocessed image and the second preprocessed image to obtain at least one image difference;
      if the at least one image difference is below or equal to a respective predetermined threshold, processing the first preprocessed image according to a first position determining mode, to thereby provide the position of the animal part; and
      if the at least one image difference is above the predetermined threshold, processing the second preprocessed image according to a second position determining mode, to thereby provide the position of the animal part.

2. A method according to claim 1, wherein each preprocessed image has a total number of pixels, and the first and second image of the animal part each have a length, width, and area, as measured in pixels, and wherein at least one image difference comprises one of a difference in length, a difference in width, and a difference in area of the first and second image of the animal part.

3. A method according to claim 1, wherein the predetermined threshold is an absolute number of pixels or a percentage of a total number of pixels.

4. A method according to claim 1, wherein the processing the second preprocessed image according to the second position determining mode takes longer and/or more processing power, on average, than the processing the first preprocessed image according to a first position determining mode.

5. A method according to claim 1, wherein the animal is a milking animal, and wherein the animal part is an udder, an udder part, a rear of the animal, and/or a body position of the animal.

6. A method according to claim 1, wherein the animal related device is one of a milking device, a premilking device, a teat cleaning device, and an udder care device, and wherein the method is performed during a part of a milking operation.

7. An animal treatment system for performing an animal related treatment on a milking animal, comprising:
   an animal related device; and
   a controller for controlling the animal related device;
   wherein the controller comprises a 3D sensor device configured to obtain a 2D image containing depth information of an animal part of the animal;
   wherein the controller is configured to perform the method of claim 1; and
   wherein the controller is configured to control the animal related device for performing the animal related treatment on the animal on the basis of the position of the animal part as determined in the method.

8. An animal treatment system according to claim 7, wherein the animal related device is one of a milking device, a premilking device, a teat cleaning device, an udder care device, or a milking means comprising a robot arm and a plurality of teat cups, and wherein the controller is configured to position at least one of the robot arm and/or one or more of the teat cups based on a position of the animal part.

9. An animal treatment system according to claim 7, wherein the sensor comprises an ultrasound sensor or an optical sensor.

* * * * *